D. MADILL.
COUPLING LINK.
APPLICATION FILED APR. 22, 1919.
1,351,298. Patented Aug. 31, 1920.
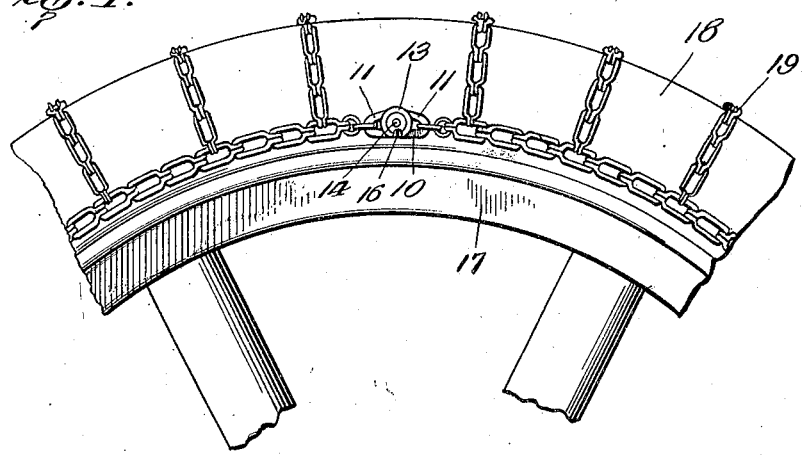
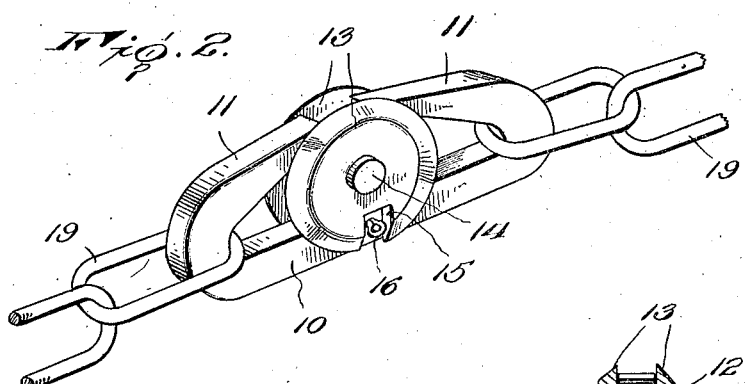
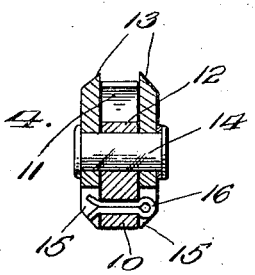
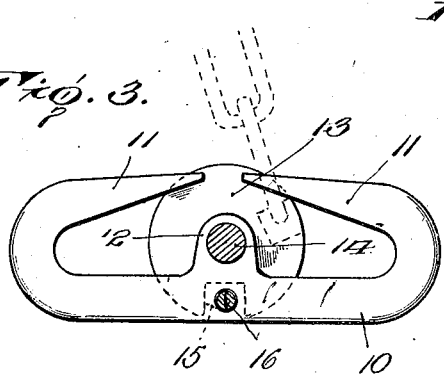
INVENTOR.
David Madill.
by Lacey & Lacey
ATTYS.

UNITED STATES PATENT OFFICE.

DAVID MADILL, OF SALT LAKE CITY, UTAH.

COUPLING-LINK.

1,351,298.   Specification of Letters Patent.   Patented Aug. 31, 1920.

Application filed April 22, 1919. Serial No. 291,833.

*To all whom it may concern:*

Be it known that I, DAVID MADILL, citizen of the United States, residing at Salt Lake City, in the county of Salt Lake and State of Utah, have invented certain new and useful Improvements in Coupling-Links, of which the following is a specification.

This invention relates to an improved coupling link particularly adapted for use in connection with automobile non-skid chains and has as one of its principal objects to provide a link of such nature that a non-skid chain may, by the use of the link, be securely fastened about the tire of a vehicle wheel.

The invention has as a further object to provide a link wherein the ends of the chain may be locked in engagement with the link so that the possibility of displacement of the chain will be positively overcome.

And the invention has as a still further object to provide a coupling link which, while being particularly designed for the purpose indicated, may also be adapted for general use.

Other and incidental objects will appear hereinafter. In the drawings:

Figure 1 is a fragmentary side elevation showing my improved link in use in connection with a conventional type of automobile non-skid chain, Fig. 2 is a detail perspective view of the device, Fig. 3 is a longitudinal sectional view of the link, and Fig. 4 is a transverse sectional view taken centrally through the device.

In carrying the invention into effect I employ a body 10 in the form of a loop split at one side to produce confronting hooks 11 at the ends of the link body. These hooks are preferably formed with tapering bills having inclined inner edges. Projecting within the link from the back thereof is a medial lug 12 upon which are mounted companion locking disks or elements 13, the peripheral edges of which are preferably inclined or beveled so as not to offer any surface obstruction. These disks are arranged at opposite sides of the lug 12 and are rotatably connected therewith by a rivet or other suitable fastening device 14.

It will be observed that the disks 13 cross the throats of the hooks 11 and project beyond the free ends of said bills to normally close the gap therebetween. Formed in the disks are notches 15 opening through the peripheries of the disks. Thus, by bringing these notches into register at the gap between the hooks 11, a link of a chain may, as suggested in Fig. 3, be inserted in the notches when, by rotating the disks in unison in one direction, the chain link may be engaged in one of the hooks 11 of the link. By then again positioning the notches of the disks at the gap of the link, the link of the chain at its opposite end may be disposed in said notches and the disks rotated in the opposite direction for engaging said link in the other of the hooks 11. Thus, the link will effectively connect the ends of the chain and since the notches of the disks must be brought into register and rotated in unison in order to free either end of the chain, it will be seen that accidental freeing of the chain by the link will be extremely unlikely. But in order that it may be positively overcome I provide a means for locking the disks against rotation, the use of this means rendering the link doubly secure. Such means consists in a stop or cotter pin 16 which, when the notches of the disks are brought together at opposite sides of the back of the link body, is removably fitted through a suitable opening in the back of the link and is received at its ends within said notches. The lock or pin will thus prevent movement of the disks while, when desired, it may be readily detached and the disks operated to free the chain ends. By spacing the ends of the pin 16 inwardly from the outer sides of the disks, the pin is effectively prevented from engaging and possibly puncturing the tire to which the tire chain is applied. Also in beveling the edges of the disks, a non-cutting surface is presented to the adjacent portion of the tire.

I accordingly provide a highly effective type of coupling link and, as previously indicated, the device is particularly designed for use in connecting the ends of automobile non-skid chains so that, by the use of my improved link, these chains may be securely fastened about a wheel tire. In Fig. 1, I have shown the device as thus used. In this figure, 17 indicates a conventional type of motor vehicle wheel about which is fitted an ordinary tire 18. Arranged about the tire I have conventionally shown a non-skid chain 19 and, as will be seen, the device is adapted to connect the terminal links of the chain ends, in the manner previously described, for securely fastening the chain upon the tire. However, while I have thus illustrated and described the particular purpose for which the invention is designed, still, I do not wish to be limited in this regard since, as will now be readily appreciated, the link is well adapted for general use.

Having thus described the invention, what is claimed as new is:

A coupling link for tire chains including a body provided with bills having their ends arranged in opposed spaced relation thereby forming a gap, said body being provided intermediate its ends with an upstanding lug terminating below said gap, a pivot pin extending through said lug, disks rotatably carried by said pivot pin on opposite sides of said body and having link receiving notches adapted for registration with said gap, the peripheral edges of said disks being beveled, said body being provided immediately below said lug with a transverse opening, and a detachable pin slidably extending through said opening and having its end portions arranged within said link receiving notches for securing the disks against rotation, the ends of said pin terminating inwardly of the outer sides of said disks whereby the same are spaced from the adjacent tire.

In testimony whereof I affix my signature.

DAVID MADILL. [L. S.]